United States Patent
Kramper et al.

(10) Patent No.: US 10,746,876 B2
(45) Date of Patent: *Aug. 18, 2020

(54) METHOD FOR THE DETERMINATION OF A PLURALITY OF DISTINCT ECHO PULSES IN ORDER TO PROVIDE DISTANCE MEASUREMENTS BY AN ACTIVE 3D SENSOR

(71) Applicant: Hensoldt Sensors GmBH, Taufkirchen (DE)

(72) Inventors: Patrick Kramper, Immenstaad (DE); Thomas Muensterer, Tettnang (DE)

(73) Assignee: Hendoldt Sensors GmbH, Taufkirchen (DE)

( * ) Notice: Subject to any disclaimer, the term of this patent is extended or adjusted under 35 U.S.C. 154(b) by 387 days.

This patent is subject to a terminal disclaimer.

(21) Appl. No.: 15/569,369

(22) PCT Filed: Apr. 27, 2016

(86) PCT No.: PCT/EP2016/000681
§ 371 (c)(1),
(2) Date: Oct. 25, 2017

(87) PCT Pub. No.: WO2016/173712
PCT Pub. Date: Nov. 3, 2016

(65) Prior Publication Data
US 2018/0306920 A1    Oct. 25, 2018

(30) Foreign Application Priority Data

Apr. 29, 2015 (EP) .................................. 15001259

(51) Int. Cl.
*G01C 3/08* (2006.01)
*G01S 17/18* (2020.01)
(Continued)

(52) U.S. Cl.
CPC .............. *G01S 17/18* (2020.01); *G01S 7/487* (2013.01); *G01S 7/4865* (2013.01); *G01S 17/10* (2013.01); *G01S 17/933* (2013.01); *G01S 17/931* (2020.01)

(58) Field of Classification Search
CPC ...... G01S 17/10; G01S 17/107; G01S 17/933; G01S 17/936; G01S 7/487; G01S 7/4865
(Continued)

(56) References Cited

U.S. PATENT DOCUMENTS 5,087,916 A * 2/1992 Metzdorff ............ G01C 21/005
342/64
6,819,407 B2 * 11/2004 Arita ...................... G01S 7/4873
180/169
(Continued)

FOREIGN PATENT DOCUMENTS

DE  10 2012 021 831 A1  5/2014
EP  2 634 597 A1  9/2013
GB  2 308 763 A  7/1997

OTHER PUBLICATIONS

PCT/EP2016/000681, International Search Report dated Sep. 9, 2016 (Three (3) pages).
(Continued)

*Primary Examiner* — Mark Hellner
(74) *Attorney, Agent, or Firm* — Crowell & Moring LLP

(57) ABSTRACT

The invention relates to a method for the determination of a plurality of distinct echo pulses originating from the same emitted signal train of an active 3D sensor in order to provide distance measurements of the surroundings in front of the 3D sensor, whereas the signal train received by the 3D sensor is subjected to a predefined trigger condition, so that only those peaks of the signal train that fulfill the predefined trigger condition are taken into account in the determination of the distinct echo pulses, According to the invention for the
(Continued)

determination of the distinct echo pulses, at least two different trigger conditions are applied simultaneously.

16 Claims, 4 Drawing Sheets

(51) Int. Cl.
    *G01S 7/487*     (2006.01)
    *G01S 17/10*     (2020.01)
    *G01S 7/4865*     (2020.01)
    *G01S 17/933*     (2020.01)
    *G01S 17/931*     (2020.01)

(58) Field of Classification Search
    USPC ........................................................ 356/5.01
    See application file for complete search history.

(56) References Cited

U.S. PATENT DOCUMENTS

| | | | | |
|---|---|---|---|---|
| 9,864,047 | B2* | 1/2018 | Koehler | G01S 7/4817 |
| 2011/0313722 | A1* | 12/2011 | Zhu | G01S 7/4802 |
| | | | | 702/159 |
| 2015/0268331 | A1* | 9/2015 | Koehler | G01S 7/4808 |
| | | | | 356/5.01 |

OTHER PUBLICATIONS

Gedcke et al., "Design of the constant fraction of pulse height trigger for optimum time resolution", Nucl. Instr. and Meth., vol. 58(2), p. 253-260, 1968.

Murray et al., "Dust-Penetrating (DUSPEN) 'see-through' lidar for helicopter situational awareness in DVE", Proc. of SPIE, vol. 8737 87370H-1, 8 total pages, 2013.

Ullrich et al., "Waveform digitizer laser scanners for surveying and surveillance applications", Proc. of SPIE, vol. 5988 87370P-1, 8 total pages, 2005.

Ullrich et al., "High resolution laser scanner with waveform digitization for subsequent full waveform analysis", Proc. of SPIE, vol. 5791, p. 82-88, 2005.

Trickey et al., "Characterization of the OPAL Obscurant Penetrating LiDAR in various Degraded Visual Environments", Proc. of SPIE, vol. 8737 87370E-2, 9 total pages, 2013.

Seidel et al., "Helicopter collision avoidance and brown-out recovery with HELLAS", Proc. of SPIE, vol. 7114 71140G-1, 8 total pages, 2008.

Stelmash et al., "Flight test results of ladar brownout look-through capability", Proc. of SPIE, vol. 9417, 14 total pages, 2015.

\* cited by examiner

METHOD FOR THE DETERMINATION OF A PLURALITY OF DISTINCT ECHO PULSES IN ORDER TO PROVIDE DISTANCE MEASUREMENTS BY AN ACTIVE 3D SENSOR

FIELD OF THE INVENTION

The invention relates to a method for the determination of a plurality of distinct echo pulses in a sequence of echo pulses originating from the same emitted signal pulse of an active 3D sensor in order to provide distance measurements of the surroundings in front of the 3D sensor.

BACKGROUND AND SUMMARY OF THE INVENTION 3D sensors, in particular lidar, radar and similar systems, increasingly become the main source of data used for both manned and unmanned vehicles operating in demanding environments. They are providing data e.g. for obstacle warning systems and for landing aid systems. For operational systems the environment is not a clinically well-defined laboratory but data processing has to cope with all aspects of a natural or man-made environment in real-time. When using 3D sensors for the active support of aerial vehicles or autonomous ground vehicles, processing the measured 3D data becomes a central task. The amount of data generated by 3D sensors can be tremendous. Therefore, a fast, intelligent and efficient way of data reduction has to be found. This invention is concerned with data selection and reduction at the very first steps in the evaluation of the sensor data (conducted in an analogue pulse analyzer as a subsystem of the 3D sensor).

Particularly for optical sensors used for obstacle warning and as landing aid in degraded vision environment (DVE), requirements for detection are diverse, sometimes competitive, or even contradictory. Primarily, the sensor can work as an obstacle warning system where it is very sensitive to small signals provided by the echo of thin wires in the range from tens of meter to more than 1000 m. For doing this, radiation can pass through air that might be obscured by fog, clouds, dust etc. The echoes originating from these obscurants must not damage the sensor and ideally should be ignored by the 3D sensor. In addition, the sensor can detect ground in the same distance range mentioned before. As the back reflected intensity decreases with $1/r^2$ or $1/r^3$ for bulk targets and for wire targets, respectively, the signal receiver has to cope with signal intensities that cover several orders of magnitude.

There are currently two approaches in common 3D measurement systems based on photon runtime measurement, i.e. time of flight counters. The first known art is to record the complete returned intensity sequence, digitize and analyze it digitally in real time. This evaluation requires enormous computing power due to the huge amount of data points on the one hand and the enormous signal dynamics on the other hand ([MUR13, ULL05a, ULL05b]).

Another known approach is to extract discrete points of time by applying a trigger condition on the signal train. The invention as described in the following will apply this particular approach.

A schematic representation of a system used for carrying out such a method is depicted in FIG. 1. An emitter 11 sends out pulses of radiation 15 (e.g. laser or radar pulses). Part of the intensity is scattered back or reflected back by an object 16 (e.g. ground, wires, obscurants) and is received by a receiver 12. The signal intensity train or signal amplitude train (short: signal train) is investigated in a pulse analyzer 13 producing one or a series of measurement distances which are prepared for further processing 14.

FIG. 2 shows an example of a signal train 21 as received by a receiver 12.

The signal train includes several signal peaks evoked by scattering of the emitted pulse by objects in different distances. The signal strength of the returning pulses is compared to a trigger threshold 41 (hereinafter also called trigger level). A peak exceeding the trigger threshold 41 is called an echo pulse (or echo for short). The time of such event (hereinafter called trigger time) is stored and such event is called a trigger event 23. Trigger time of an echo and the distance of the object that gave rise to this particular echo are connected via the velocity of the electromagnetic radiation emitted by the 3D sensor which can be taken as constant. Hence, trigger time and object distance are equivalent and can both be used for the horizontal axis of the diagram of FIG. 2 (this applies also to the diagrams of FIG. 3 to 6). As shown in FIG. 2, the trigger level 41 may be time-dependent, i.e. decreasing with time, to compensate for signal decrease with distance. As a result, undesired events, in particular caused by fog and snow, are suppressed. Those signals are often much smaller than signals of hard targets. An example of such time dependent trigger condition is disclosed in DE 10 2012 021 831 A1. There, a step function is applied. For short distances (i.e. short measurement times), a higher trigger level is applied than for longer distances (i.e longer measurement times).

In the example of FIG. 2, a so-called rising edge trigger is used, i.e. the trigger time is defined by the time the signal strength reaches the trigger level on the rising edge of the echo pulse. There are numerous other well-known trigger methods in order to determine an echo pulse and to derive a trigger time there from. Simple methods are comparators and Schmitt triggers where the signal train is compared to trigger thresholds and the time of the rising or the falling edge of the threshold crossing is recorded. More sophisticated methods are pulse width triggers and constant fraction discriminators [GED68]. The trigger conditions typically contain one or more trigger parameter, like threshold, rise time, etc. The variety of conditions can be extended by combining or cascading trigger methods and parameters. In this manner, trigger conditions can be tailored for expected patterns of the signal train.

Additional measures are known in order to dismiss undesired echoes and thus limiting the number of echoes to be processed. They may stem from dust, fog, etc. in the vicinity of the sensor. A frequently used technique to avoid such undesired trigger events is to use the so-called range gating. Echoes arriving from distances smaller than a minimum distance (hereinafter: the near range distance) are suppressed thus creating a blind zone in the direct vicinity of the 3D sensor.

The echoes of the signal train 21 which are received from outside said blind zone (and originating in the same signal pulse emitted by the 3D sensor) are intuitively labeled $1^{st}$ echo, $2^{nd}$ echo, $3^{rd}$ echo, last echo, etc. according to their rank in the chronological order in which the echo pulses are received. It has been reported that up to 16 echo pulses of these sequence of pulses are being processed [TRI13]. Here, too, computing power limits the number of echo pulses to be processed. Interface bandwidth and the need for real-time processing are highly limiting factors, especially in airborne applications. When the correlation between different echoes is investigated, the required processing power increases tremendously with the number of returns processed. As a consequence, frequently only two echoes are exploited [SEI08]. They are typically an acceptable compromise between the need of information of more than one echo and the available computing performance.

A known two-echo approach [STE15] that exploits first and second echo uses a so-called delta range gate: One defines a so-called blind zone immediately behind (as seen from the 3D sensor) the object that caused the first echo. Any trigger event caused by an echo from objects within the blind zone (in the time domain this corresponds to a certain time slot after arrival of the first echo), will be ignored. Hence, the second trigger event can only be caused by an echo arriving from distances behind the blind zone.

The less echoes that are processed, the more crucial it is to choose those echoes for further processing that contain the most useful information. The selected echoes shall produce measurement distances of real objects instead of artifacts. In the context of obstacle warning under normal weather conditions, processing of the $1^{st}$ echo is inevitable. In most cases it contains the echo of the actual obstacles. Commonly, a $1^{st}/2^{nd}$ echo scheme or a $1^{st}$/last echo scheme is used. The second echo seems to be the best choice for obstacle detection in most DVE situations. Here, the first echo might be an echo from an obscurant e.g. dust, rain, fog or snow and the second echo might stem from an actual obstacle. Ground detection is another key function. It is the main task during lift off, approach and landing and, in addition, it is a significant side functionality in obstacle warning. For ground detection, the last echo is to be preferred as ground will always cause the very last echo.

Irrespective of the number of echoes processed, conventional 3D sensors use only one trigger condition that is used for the determination of all echoes processed.

As the intensity scattered by the objects that give rise to an echo is highly dependent of their distance to the sensor, it is the object of the invention to provide a method for processing echo pulses which provides an improved suppression of undesired trigger events.

According to the present invention different trigger conditions, like trigger thresholds, are used for the determination of the pre-defined distinct echo pulses that are to be exploited. These trigger conditions are each used simultaneously. The evaluation can be performed in separate process channels.

By doing so, the different trigger conditions can be adapted to typical echo distances, expected strength and rank in the chronological order of the individual echoes to be processed. For example, a trigger threshold for determining the first echo will generally be higher than a trigger threshold for the determination of a later echo. In a preferred embodiment, the conditions or parameters in both channels can be time dependent. Another advantageous option is to apply a time dependence on the trigger condition of at least one channel, but not of all channels.

The application of different trigger conditions is done in separate process channels so that, for each trigger condition applied, an independent series of trigger times/echo distances is recorded. For example, reception and recording of trigger times of the echo pulses is done in parallel in separate pulse analyzers applying different trigger conditions to the sequence of received signal pulses.

It is an important advantage that the described evaluation of the distinctive echo pulses by using individual trigger conditions, e.g. trigger levels, allows independent optimization with respect to the intended purpose of the 3D data. One important special case is ground detection under brownout conditions. Here, the intensity reflected from the cloud of dust may be strong and the transmitted intensity may be highly attenuated even in short distances. Therefore, an increase of trigger level is only advantageous with respect to the suppression of undesired trigger events for a first echo and a second echo but not for a last echo.

Furthermore, the use of independent trigger conditions allows qualitative conclusions about echo signal strength or shape. For instance, in a process applying two different trigger levels (relating to first echo/second echo), the fact that an echo has fulfilled both trigger conditions may provide useful additional information. In cases where there is only a second echo but no first echo or in cases where the trigger time of the second echo is earlier compared to the trigger time of the first echo, the information is already inherently included in the distance information. In the important case when the trigger level for the second echo is lower than that for the first echo the second echo must be a weak echo.

The method according to the invention is applicable for all types of 3D measuring devices with time of flight measurements and subsequent pulse analysis resulting in discrete values for echo distances.

The method according to the invention satisfies the requirements for a wide range of 3D sensor applications and operational situations, especially for optical 3D scanners. It can be completely implemented in the analogue pulse analyzer of the 3D sensor. The described logical operations performed on the signal train are easy to implement in hardware or firmware.

It is a further advantage of the method according to the invention that the filtering process according to the invention is performed at an early stage of the complete processing chain where it is most effective. The invention reduces the information of each single 3D measurement to discrete distance values that contain the desired information and that are affected by artifacts as little as possible.

The 3D sensor data (i.e. the distinct echo pulses) generated according to the present invention can be further processed according to well-known techniques. In particular the 3D data can be fused with navigational data in order to provide geo-referenced 3D data of the surroundings. Filtering operations can be conducted to remove the adverse impact of sun, cloud, dust, drop-in etc. on the 3D data. Further, a classification of objects can be performed and warnings and visualization outputs can be generated and brought to the attention of the human operator of the vehicle.

BRIEF DESCRIPTION OF THE FIGURES

The present invention is described in more detail below with references to several figures.

DETAILED DESCRIPTION OF EXEMPLARY EMBODIMENTS

The following description is based on a 2-echo schedule implemented by a 3D sensor. That means, two distinct echoes of the received signal train are exploited, specifically first and second echo.

Figure 1:
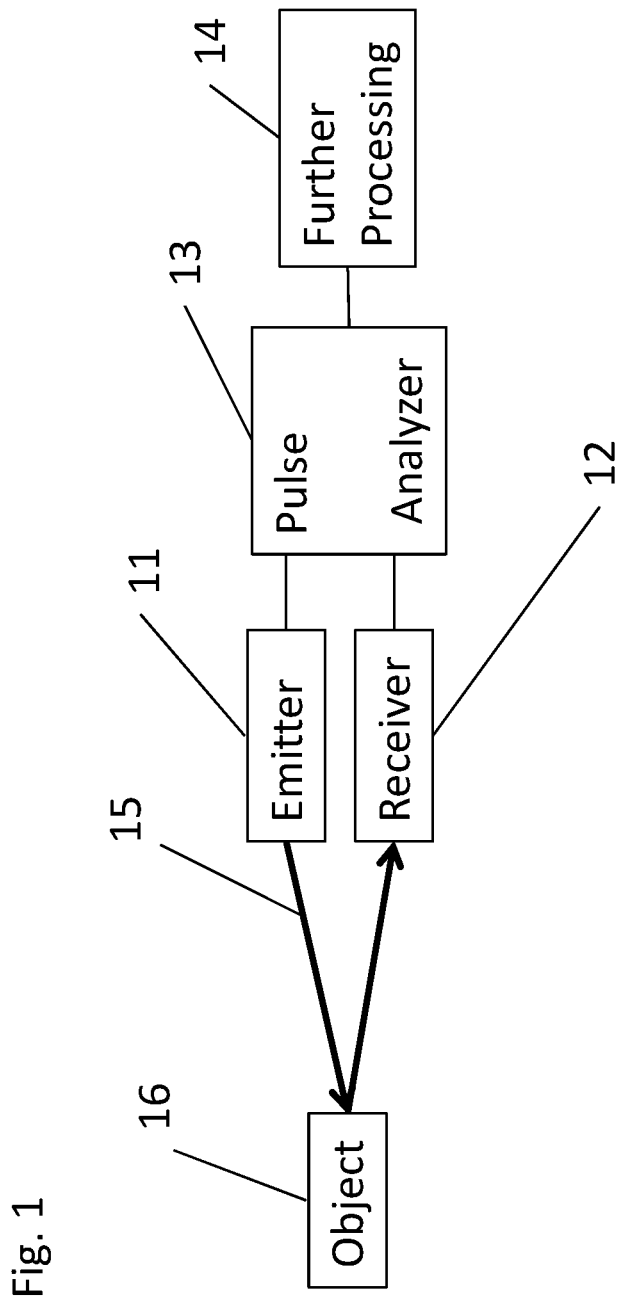
FIG. 1 shows a block diagram of a known subsystem of a 3D sensor as already described above. Such system can also be used for carrying out the method according to the present invention.
Figure 2:
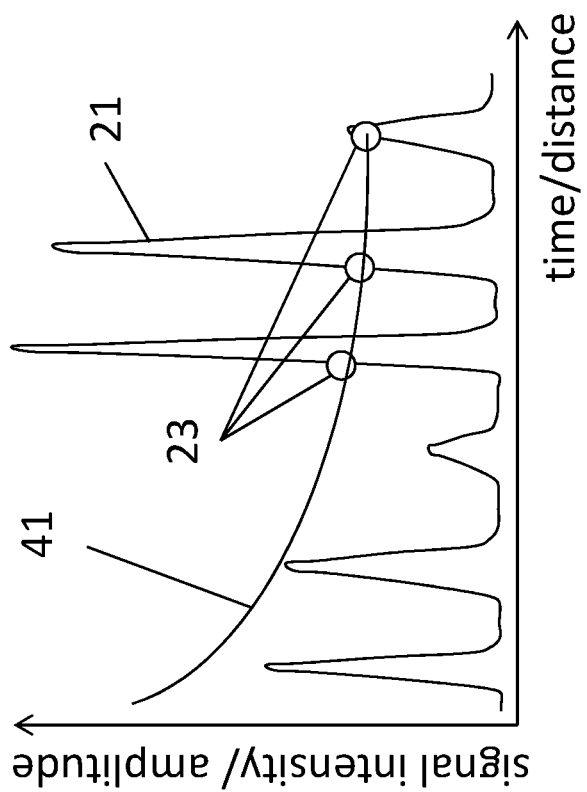
FIG. 2 illustrates the signal intensity/amplitude of the received signal train compared to a time-dependent trigger condition (here: based on a pre-defined trigger threshold) as described above.
Figure 3:
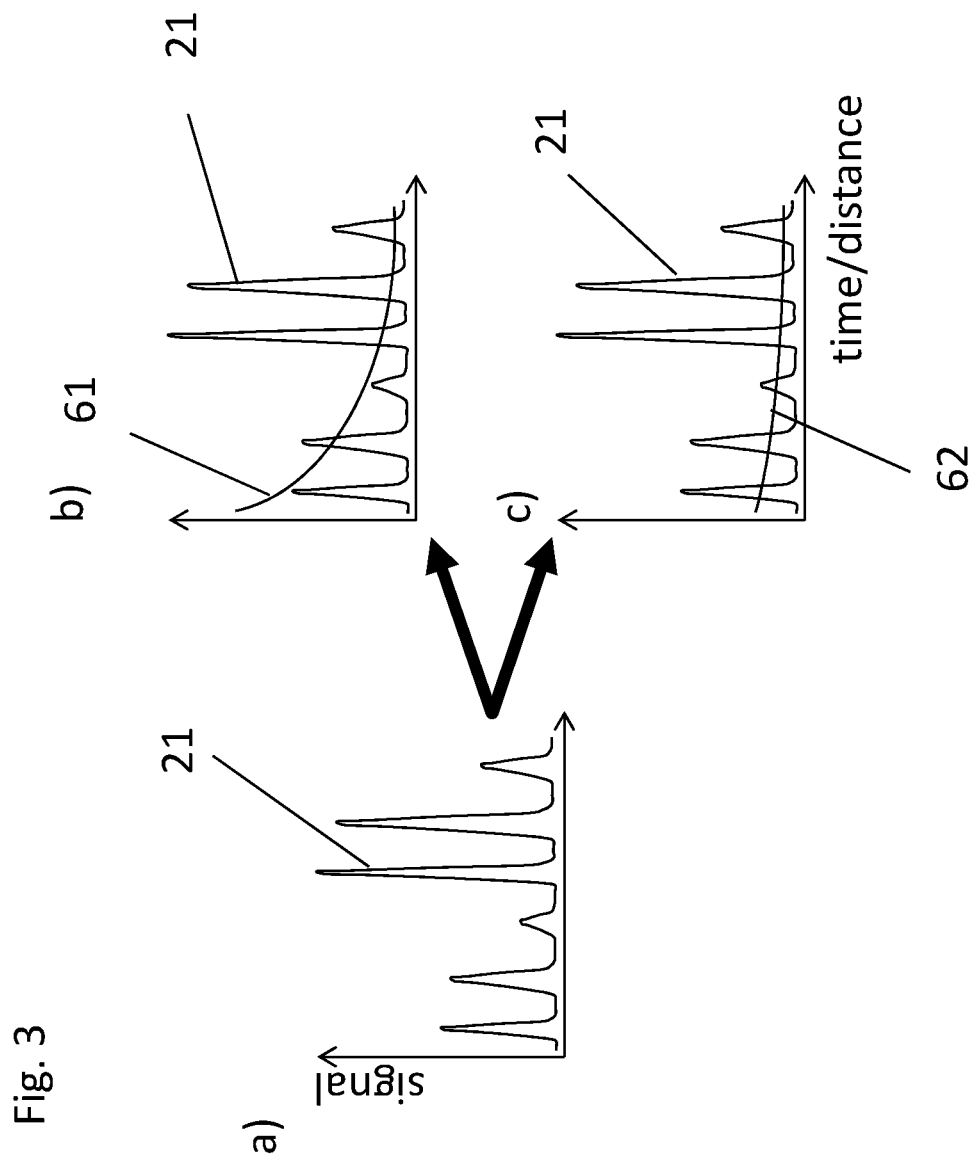
FIG. 3 illustrates the signal intensity/amplitude of the received signal train compared to two different time-dependent trigger conditions (here: based on pre-defined trigger thresholds) applied for the determination of first and second echo.

FIG. 3 schematically shows in diagram a) a signal train 21 as received by the 3D sensor as a sequence of echo peaks. According to the invention, signal train 21 is subjected to two different trigger conditions which are represented here by different trigger thresholds 61 and 62 (shown in diagrams b) and c) of FIG. 3) in order to determine first and second echo. Both trigger thresholds are constructed in a time-dependent fashion so that they decrease with time. The trigger threshold 61 used for the determination of the first echo is typically higher than the threshold 62 for the determination of the second echo in order to take into account the potential origin of the signal. The selection of comparatively higher trigger levels is of particular importance for the determination of the first echo because "wasting" the first echo to an artifact is sought to be avoided. With respect to the determination of the second echo arriving from a more distant object the comparatively lower trigger level ensures that sensitivity of the 3D sensor is still sufficient. This is of particular importance in situations where the signal is highly attenuated e.g. in the presence of dust.

Figure 4:
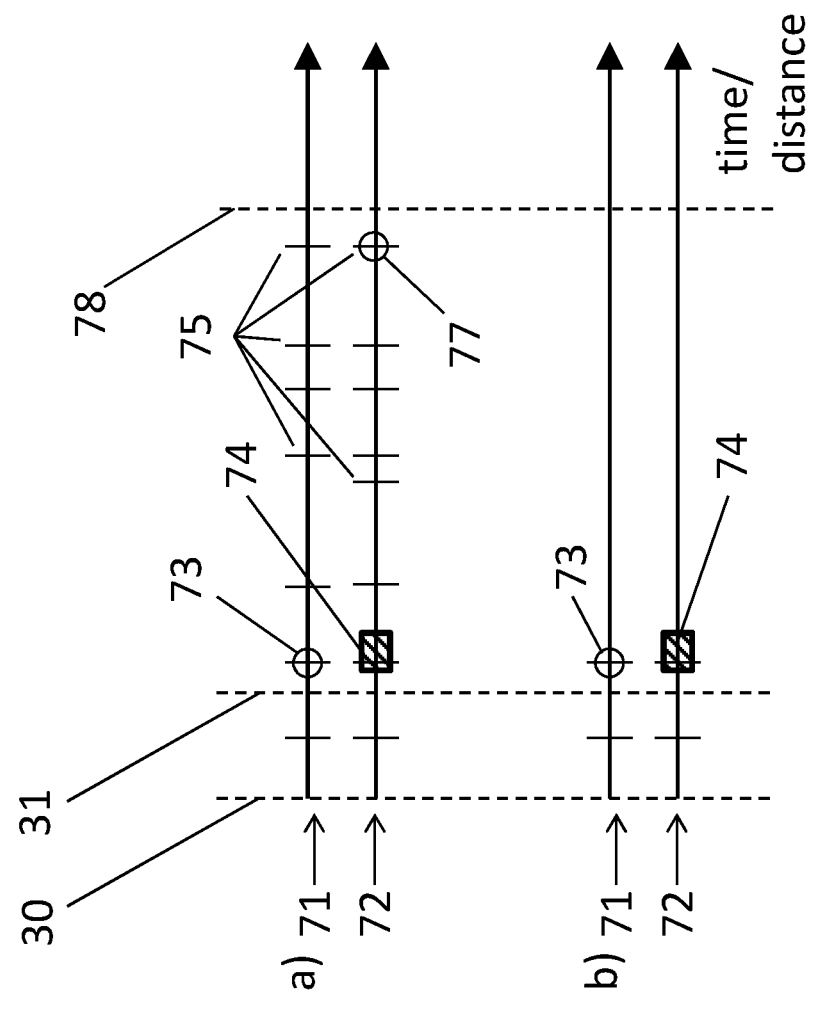
FIG. 4 illustrates the determination of first and second echo by using two different trigger thresholds.

FIG. 4 illustrates two examples a),b) of how first 73 and second echo 77 according to the invention are determined. In each example, two independent series 71,72 of trigger times/echo distances 75 (each indicated by a vertical stroke along the time line) were recorded. The trigger times ultimately selected as belonging to first 73 and second echo 77 are additionally marked with a small circle.

The first series 71 was generated by using a higher trigger level (e.g. trigger level 61 of FIG. 3b)) and the second series 72 was generated by using a comparatively lower trigger level (e.g. trigger level 62 of FIG. 3c)).

The dotted vertical line 30 on the left marks the time t=0, that corresponds to the distance d=0 of an object from the 3D sensor. Numeral 31 designates the near range distance. Trigger events that correspond to a distance smaller than the near range distance are generally ignored. The length of the near range distance typically amounts to at least 20 m, and may increase with increasing speed of the sensor carrier (e.g. a helicopter). All trigger events beyond the end of range distance 78 are ignored. Both trigger levels are applied simultaneously over the whole measurement range, i.e. between the near range distance 31 and the end of range distance 78.

A blind zone 74 immediately behind the object that caused the first echo can be defined (first echo blind zone). Echoes from objects of this zone are ignored, in particular for the purpose of avoiding double triggering (i.e. identical or similar trigger times but relating to the same physical object, like two branches of the same tree, or electronic artefacts, etc.). It has to be noted that the introduction of the blind zone 74 provides specific advantages with respect to the avoiding of double triggering as just explained. However, the blind zone behind the first object is not mandatory. Acceptable results of the method according to the invention can be achieved already without the application of the blind zone.

The first echo is determined based on the first series 71 of trigger events. Accordingly, the first echo 73 is the particular echo of series 71 that occurs first after the near range distance 31.

The selection of the second echo is based on the second series 72 of trigger events 75. Again, echoes belonging to objects at a distance smaller than the near range distance 31 are generally ignored.

In example a) the last echo which appears in series 72 is determined as the last echo 77.

In example b) no second echo is generated because in series 72 the sole trigger event beyond the near range distance lies in the blind zone 74 of the first echo (as determined based on the trigger events of series 71).

CITATIONS

[GED68] D. A. Gedcke and W. J. McDonald, "Design of the constant fraction of pulse height trigger for optimum time resolution", Nucl. Instr. and Meth. 58(2): p 253 (1968).

[MUR13] J. T. Murray et.al, "Dust-Penetrating (DUSPEN) "see-through" lidar for helicopter situational awareness in DVE", Proc. of SPIE Vol. 8737 87370H-1 (2013).

[ULL05a] A. Ullrich and R. Reichert, "Waveform digitizing laser scanners for surveying and surveillance applications", Proc. of SPIE Vol. 5988 59880P-1 (2005).

[ULL05b] A. Ullrich and R. Reichert, "High resolution laser scanner with waveform digitization for subsequent full waveform analysis", Proc. of SPIE Vol. 5791 (2005).

[TRI13] E. Trickey, P. Church and X. Cao, "Characterization of the OPAL Obscurant Penetrating LiDAR in various Degraded Visual Environments", Proc. of SPIE Vol. 8737 87370E-2 (2013).

[SEI08] Seidel, C., Schwartz I., Kielhorn P., "Helicopter collision avoidance and brown-out recovery with HEL-LAS", Proc. of SPIE Vol. 7114, 71140G-1, (2008).

[STE15] Stephen Stelmash, Thomas Münsterer, Patrick Kramper, Christian Samuelis, Daniel Bühler, Matthias Wegner, Sagar Sheth, "Flight test results of ladar brown-out look-through capability", Proc. Of SPIE Vol. 9417, (2015).

The invention claimed is:

1. A method for determining a plurality of distinct echo pulses originating from an emitted signal train of an active 3D sensor in order to provide distance measurements of the surroundings in front of the active 3D sensor, the method comprising:
   receiving the emitted signal train by the active 3D sensor, wherein the emitted signal train is subjected to a predefined trigger condition such that only those peaks of the emitted signal train that fulfill the predefined trigger condition are taken into account in said determining the plurality of distinct echo pulses; and
   determining the plurality of distinct echo pulses by applying at least two different trigger conditions simultaneously in separate process channels.

2. The method according to claim 1, wherein the plurality of distinct echo pulses are a first and a second echo pulse in a sequence of echo pulses originating from the emitted signal train of the active 3D sensor.

3. The method according to claim 1, wherein the plurality of distinct echo pulses are a first and a last echo pulse in a sequence of echo pulses originating from the emitted signal train of the active 3D sensor.

4. The method according to claim 1, wherein at least one of said trigger condition is time-dependent and at least one other of said trigger conditions is independent of time.

5. The method according to claim 2, wherein at least one of said trigger condition is time-dependent and at least one other of said trigger conditions is independent of time.

6. The method according to claim 3, wherein at least one of said trigger condition is time-dependent and at least one other of said trigger conditions is independent of time.

7. The method according to claim 1, wherein echo pulses from distances smaller than a predefined near range distance are not taken into consideration.

8. The method according to claim 2, wherein echo pulses from distances smaller than a predefined near range distance are not taken into consideration.

9. The method according to claim 3, wherein echo pulses from distances smaller than a predefined near range distance are not taken into consideration.

10. The method according to claim 4, wherein echo pulses from distances smaller than a predefined near range distance are not taken into consideration.

11. The method according to claim 1, wherein, during a predefined time slot around the time of arrival of one of the plurality of distinct echo pulses, any further echo pulse from the emitted signal train is not taken into consideration.

12. The method according to claim 2, wherein, during a predefined time slot around the time of arrival of one of the plurality of distinct echo pulses, any further echo pulse from the emitted signal train is not taken into consideration.

13. The method according to claim 3, wherein, during a predefined time slot around the time of arrival of one of the plurality of distinct echo pulses, any further echo pulse from the emitted signal train is not taken into consideration.

14. The method according to claim 4, wherein, during a predefined time slot around the time of arrival of one of the plurality of distinct echo pulses, any further echo pulse from the emitted signal train is not taken into consideration.

15. The method according to claim 7, wherein, during a predefined time slot around the time of arrival of one of the plurality of distinct echo pulses, any further echo pulse from the emitted signal train is not taken into consideration.

16. The method according to claim 1, wherein the determining of the plurality of distinct echo pulses by applying at least two different trigger conditions simultaneously in separate process channels is carried out in parallel in separate pulse analyzers.

* * * * *